United States Patent
Geidek et al.

(10) Patent No.: US 9,647,754 B2
(45) Date of Patent: May 9, 2017

(54) ACTIVE SYSTEM FOR SENSING A TARGET OBJECT

(71) Applicant: MBDA Deutschland GmbH, Schrobenhausen (DE)

(72) Inventors: Franz Geidek, Aresing (DE); Markus Braendle, Geisenfeld (DE); Michael Fall, Wemding (DE); Juergen Zoz, Friedberg (DE)

(73) Assignee: MBDA Deutschland GmbH, Schrobenhausen (DE)

( * ) Notice: Subject to any disclaimer, the term of this patent is extended or adjusted under 35 U.S.C. 154(b) by 0 days.

(21) Appl. No.: 14/913,122

(22) PCT Filed: Aug. 4, 2014

(86) PCT No.: PCT/DE2014/000397
§ 371 (c)(1),
(2) Date: Feb. 19, 2016

(87) PCT Pub. No.: WO2015/024546
PCT Pub. Date: Feb. 26, 2015

(65) Prior Publication Data
US 2016/0202356 A1    Jul. 14, 2016

(30) Foreign Application Priority Data
Aug. 22, 2013   (DE) .................. 10 2013 014 045

(51) Int. Cl.
*G01S 11/14*   (2006.01)
*G01S 17/66*   (2006.01)
(Continued)

(52) U.S. Cl.
CPC ........ *H04B 10/1125* (2013.01); *G01S 17/023* (2013.01); *G01S 17/66* (2013.01)

(58) Field of Classification Search
CPC .................. G01B 11/14; G01S 17/66
(Continued)

(56) References Cited

U.S. PATENT DOCUMENTS

| 4,168,908 A | * | 9/1979 | Cubalchini | G01S 17/66 250/203.1 |
| 5,198,653 A | * | 3/1993 | Shen | G02B 26/06 250/201.9 |

(Continued)

FOREIGN PATENT DOCUMENTS

| DE | 41 22 623 A1 | 1/1993 |
| DE | 103 35 501 A1 | 2/2004 |

(Continued)

OTHER PUBLICATIONS

PCT/DE2014/000397, International Search Report dated Jan. 5, 2015 (Two (2) pages).

*Primary Examiner* — Roy M Punnoose
(74) *Attorney, Agent, or Firm* — Crowell & Moring LLP

(57) ABSTRACT

An active system includes a transmitting/capturing device having a detection device configured to capture a target object, where the transmitting/capturing device includes a laser source and a camera. The active system also includes a first control system configured to drive a first positioning system to align a beam path between the transmitting/capturing device and the target object, and a second control system configured to drive a second positioning system to align the beam path. The active system further includes a third control system configured to drive a third positioning system to align the transmitting/capturing device, where the third control system has an additional capturing device, and the third positioning system can be driven on the basis of data from the additional capturing device.

18 Claims, 4 Drawing Sheets

(51) Int. Cl.
*H04B 10/112* (2013.01)
*G01S 17/02* (2006.01)

(58) Field of Classification Search
USPC .......................................................... 356/622
See application file for complete search history.

(56) References Cited

U.S. PATENT DOCUMENTS

| | | | | |
|---|---|---|---|---|
| 6,809,307 | B2* | 10/2004 | Byren | F41H 13/0043 |
| | | | | 250/201.9 |
| 6,849,841 | B2* | 2/2005 | Byren | G02B 27/0037 |
| | | | | 250/201.1 |
| 7,158,867 | B2* | 1/2007 | Filep | F41G 3/145 |
| | | | | 701/23 |
| 7,171,126 | B2 | 1/2007 | Cicchiello et al. | |
| 7,477,368 | B2* | 1/2009 | Guthrie | G02B 17/008 |
| | | | | 250/201.1 |
| 2002/0080455 | A1 | 6/2002 | Maraglit et al. | |
| 2005/0069325 | A1 | 3/2005 | Cicchiello et al. | |
| 2013/0180965 | A1 | 7/2013 | Komatsu | |

FOREIGN PATENT DOCUMENTS

| | | |
|---|---|---|
| DE | 10 2004 045 408 A1 | 3/2006 |
| GB | 2 252 398 A | 8/1992 |

\* cited by examiner

ACTIVE SYSTEM FOR SENSING A TARGET OBJECT

CROSS REFERENCES TO RELATED APPLICATIONS

This application is a National Stage of PCT International Application No. PCT/DE2014/000397, filed Aug. 4, 2014, which claims priority under 35 U.S.C. §119 from German Patent Application No. 10 2013 014 045.5, filed Aug. 22, 2013, the entire disclosures of which are herein expressly incorporated by reference.

FIELD OF THE INVENTION

The present invention relates to an active system which can be used in particular for capturing and tracking target objects.

BACKGROUND

In order to be able to act on a target object, it is necessary to be able to precisely capture and track the target object. Optical target acquisition systems, for example, are known from the prior art for this purpose, which are aimed at the target and held thereon by means of high-precision mechatronic positioning systems. Only then can the target be acted on. If the point of accuracy which must be achieved in order to engage the target is a few microrad, for example when aiming a laser beam at the target, the problem often occurs, especially in the case of quickly moving objects or objects which are highly agile and can change their trajectory, that the necessary precision cannot be achieved with a single positioning system or can only be realized with considerable effort. This is especially true if, in addition, the largest possible range of angles is to be covered by the positioning system. Various examples are known from the literature in which the precision to be achieved from the total system is attained by means of cascading positioning system levels with increasing precision (DE 4122623 A1, U.S. Pat. No. 7,171,126 B2). The challenge in operating these cascading total systems is in combining the sensor information present in the system such that the target can always be tracked with the highest precision.

SUMMARY OF THE INVENTION

It is an object of the invention to provide an active system with a simple and economical construction and low-maintenance operation which enables the secure and reliable capturing and/or tracking of a target object.

The object may be achieved by an active system which, in addition to a transmitting/capturing device for acting against a target object, comprises a first control system, a second control system, and a third control system, as well as preferably two sensor planes for detecting the motion of the target. The first control system and the transmitting/capturing device may in particular be implemented in the active system in a variety of forms. The transmitting/capturing device comprises a detecting device for detecting the target object. In addition, the transmitting/capturing device is preferably arranged to establish a beam path to the target object. This can be realized, for example, by means of an optical beam, acoustic beam or electromagnetic beam. The beam path thus extends from the transmitting/capturing device to the target object and must therefore always be adapted to the movement of the target object. A positioning system is present for this purpose, which is driven by the first control system, wherein the first positioning system deflects the beam path. In this way, the first control system adjusts the beam path such that this always extends from the transmitting/capturing device to the target object, even if the target object moves. Similarly, a second positioning system is present which is controlled by a second control system. The second positioning system also deflects the beam path, so that the first positioning system and the second positioning system work together to define the orientation of the beam path. As previously described, the beam path can therefore be aligned in such a way that it extends from the transmitting/capturing device to the target object. A third control system finally serves to drive a third positioning system. The third positioning system acts directly on the transmitting/capturing device and can thus be used to align the entire transmitting/detecting device. By combining the first control system, the second control system and the third control system, all movements of the target object can be accurately tracked. For tracking the target, the placement of the total system with respect to the target is observed in particular via a first of the two sensor levels integrated in the active system, and the placement of the third positioning system with respect to the target is observed via a second sensor level.

In one advantageous development, the first control system and the second control system are designed to be coupled. This means that the control loop of the second control system is closed by additional information from the first control system.

Particularly advantageously, the first positioning system has a zero position, wherein the second control system is adapted to move the first positioning system to this zero position or alternatively to hold the first positioning system in this zero position. Thus results the above-described coupling of the first control system and the second control system. The moving to the zero position and/or the holding in the zero position preferably takes place by means of the second positioning system. In this way, in particular the positioning range of the transmitting/capturing device is increased. The zero position of the first positioning system can be shifted by means of the second positioning system, so that the first positioning system operates in a shifted range. Furthermore, it is preferably provided that the first positioning system is designed for higher performance than the second positioning system. The first positioning system thus always guides the beam path to the target object, wherein even rapid changes in the movement of the target object can be tracked. However, the performance is accompanied by a lesser deflection capability of the first positioning system. The second positioning system thus expands the positioning range of the transmitting/capturing device, without negatively influencing the performance of the first positioning system.

In one possible embodiment of the active system, the third control system is constructed independently from the first control system and the second control system. In an alternative embodiment, the third control system is used to move the second control system to its zero position or to hold it in this zero position. In this case, the third control system is coupled to the second control system.

It is preferably provided that the transmitting/capturing device is an optical transmitting/capturing device.

The transmitting/capturing device advantageously has an acting device.

The transmitting/capturing device comprises in particular a laser source and a camera at the level of the first control system, wherein a multiple execution with a plurality of laser sources and cameras arranged in individual channels is preferably also possible. The laser source is designed to transmit a laser beam to the target object. The camera is designed to detect the target object. The functionality mentioned in the previous paragraph is implemented in this way. The laser source is especially suited for use as an acting device, as a laser beam has a long range and thus even distant target objects can be contacted by the beam.

In a further preferred embodiment of the active system, the first positioning system is a piezoelectric actuator. This can be very quickly deflected. As a piezoelectric actuator, the first positioning system is thus high performance, whereby even quickly moving target objects can be captured and tracked.

It is also preferably provided that the second positioning system is a moving coil unit, with which a tilting mirror can be moved in a tip-tilt direction via the moving coil. In comparison with the previously mentioned piezoelectric actuator, the moving coil unit has a larger maximum deflectability, wherein the performance is lower. The second positioning system is thereby ideally suited for coupling to the first positioning system, as benefits are thus reaped simultaneously from the performance of the first positioning system and from the large deflectability of the second positioning system.

The third positioning system is advantageously an industrial robot. In comparison with the piezoelectric actuator and the moving coil unit, this has the greatest maximum deflection and the lowest performance. Through the use of the industrial robot, a very large range is present in which the transmitting/capturing device can capture and track target objects. The low performance of the industrial robot is compensated for by the first positioning system and/or the second positioning system.

In a further advantageous embodiment of the active system, the first control system is arranged such that it controls the first positioning system on the basis of the data of the capturing device arranged at this level. This means that the capturing device recognizes a deviation of the target object with respect to a reference point, wherein this deviation is regulated by the first control system. The reference point is thus placed back on the target object by the first control system. The first control system thus also enables the application of the reference point to different areas of the target object. In particular a primer of the target object or another relevant area of the target object can thus be directly captured and tracked.

The third control system preferably comprises an additional capturing device. Thus, the third control system is not connected to the first capturing device, but rather has its own basis by means of the additional capturing device, so that the third control system can be controlled based on the data of the additional capturing device. Compared to the capturing device, the additional capturing device is preferably less exact, but has a larger field of view. Thus, only a rough alignment of the detection device to the target is possible by means of the third control system. The precise alignment is accomplished by the first positioning system and/or the second positioning system.

In particular, the additional capturing device provides data which can be used as a pre-control for the second positioning system. The performance of the second control system is thereby increased.

It is also preferably provided to use only the above-mentioned type of control for the second positioning system. This is particularly sensible in target capturing if the target object has already appeared in the additional capturing device due to a greater field of view, but cannot yet be observed with the detection device in the transmitting/capturing device.

The invention will now be described in more detail with reference to exemplary embodiments with consideration of the accompanying drawings.

DETAILED DESCRIPTION OF EXEMPLARY EMBODIMENTS

Figure 1:
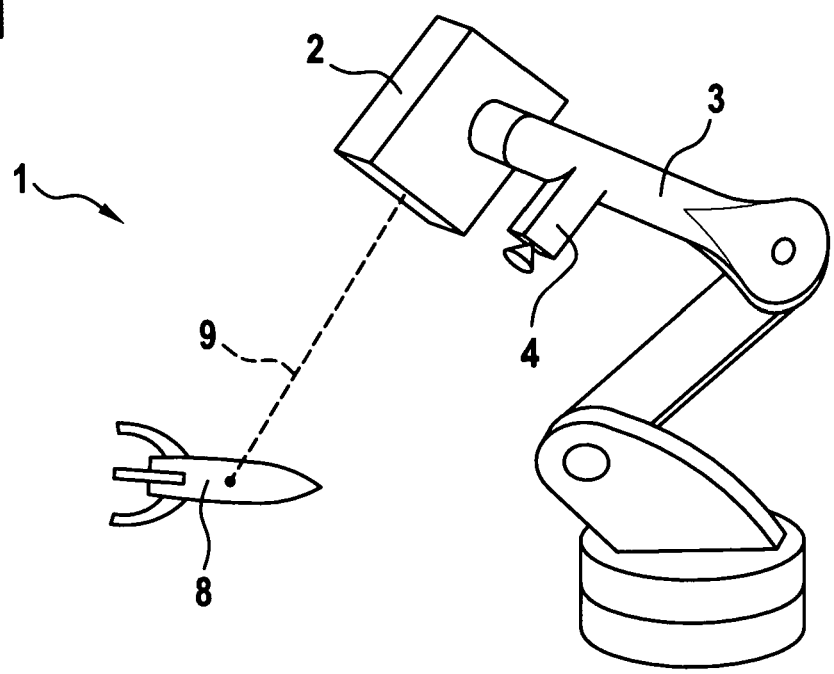
FIG. 1 shows a schematic representation of an active system according to one exemplary embodiment of the invention.

FIG. 1 shows the active system 1 according to a preferred exemplary embodiment of the invention. In addition, FIG. 1 shows a projectile as a target object 8. In order to capture and track the target object 8, a transmitting/capturing device 2 is present, which is mounted on a third positioning system 3. The transmitting/capturing device 2 also comprises a first positioning system 7 and a second positioning system 6 (see FIG. 2), which are used for deflecting a beam path 9.

The beam path 9 extends from the transmitting/capturing device 2 to the target object 8. When the target object 8 moves, the beam path 9 must be adjusted accordingly. This occurs by means of a multi-stage system.

Figure 2:
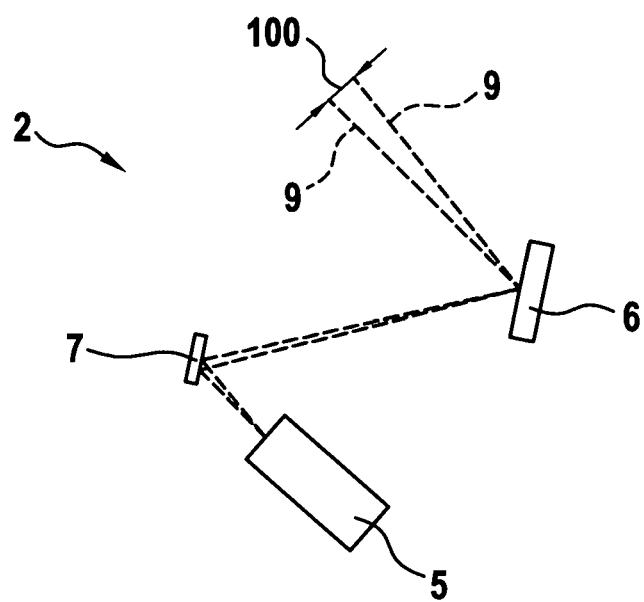
FIG. 2 shows a schematic representation of a section of the active system according to the preferred exemplary embodiment of the invention.

A fine adjustment and a central adjustment are each shown in FIG. 2. A lighting device 5 emits a laser beam along the beam path 9, wherein the beam path 9 can be deflected by the first positioning system 7 and the second positioning system 6. The first positioning system 7 can be controlled by a first control system 10 (see FIG. 3) and the second positioning system 6 can be controlled by a second control system 20 (see FIG. 5). Reflected light can be detected by a detection device 14 (see FIG. 3). The detection device is integrated in particular into the lighting device 5.

The first positioning system 7 is very high-performing, whereby no large deflectability must be provided. In particular, the first positioning system 7 has a maximum positioning range of one millirad. The first positioning system 7 is therefore preferably a piezoelectric actuator. The piezoelectric actuator in particular drives a first mirror, which changes a direction of the beam path 9. If the target object 8 moves relative to the transmitting/capturing device 2, the first positioning system 7 can thus track this movement, in that the beam path 9 is appropriately deflected. A steady capturing and tracking of the target object 8 is thus possible. This is described in detail below:

If a deviation 100 of the target object 8 to a reference point arises, this deviation 100 must also be introduced in the beam path 9, which occurs by means of the first positioning system 7. The introduction of a change in the beam path 9 thus leads to a deflection of the first positioning system 7. The second control system 20 is thus adapted to move the first positioning system 7 back to the zero position by the means of the second positioning system 6. Since a lower performance is necessary here, the requirements on the second positioning system 6 are lower. However, the second positioning system 6 advantageously requires a greater deflectability than the first positioning system 7. The second positioning system 6 is therefore in particular a mirror which can be moved in tip-tilt direction by means of a moving coil. This second mirror deflects the beam path 9 just as the aforementioned first mirror. In particular, the deflection by the second mirror takes place after the deflection by the first mirror.

The second positioning system 6 is controlled by the second control system 20 such that a deflection of the first positioning system 7 is reversed and the first positioning system 7 is guided back to the zero position. The second positioning system 7 thus increases the area which can be covered with the transmitting/capturing device 2, in that the zero position of the first positioning system 7 is displaced. Here, it is nevertheless possible for the transmitting/capturing device 2 to use the performance of the first positioning system 7 for following the target object 8, i.e., maintain the reference point.

It is therefore possible to track the target object 8 in two stages with the transmitting/capturing device 2. Small movements or changes in movement of the target object 8, which are in particular executed abruptly, are possible through deflection of the beam path 9 with the first positioning system 7. The first positioning system 7 thus acts as a precision alignment system. So that larger movements or changes in movement of the target object 8 can also be followed, the second positioning system 6 guides the first positioning system back to the zero position after a deflection. The second positioning system 6 is thus a central alignment system.

In FIGS. 1 and 2, the first positioning system 7 and the second positioning system 6 are shown as a sub-unit of the transmitting/capturing device 2.

FIG. 1 shows that the transmitting/capturing device 2 is mounted on the third positioning system 3. The third positioning system 3 serves as a rough alignment system and is in particular an industrial robot. Through the arrangement of the transmitting/capturing device 2 on the third positioning system 3, the transmitting/capturing device 2 can be moved as a complete unit, in order to further increase its effective range. The third positioning system 3 preferably has a sufficient degree of freedom of movement to allow an orientation of the transmitting/capturing device 2 in azimuth and elevation. For this purpose, the third positioning system 3 is in particular an at least two-axis industrial robot.

In order to operate the third positioning system 3 independently of the first positioning system 7 and the second positioning system 6, a third control system driving the third positioning system 3 is operated independently of the first control system 10 and the second control system 20. Therefore, an additional capturing device 4 is preferably provided, which is preferably arranged directly on the third positioning system 3. The additional capturing device 4 is used to capture the target object 8, wherein the precision of the additional capturing device 4 is lower than that of the transmitting/capturing device 2. In particular, the additional capturing device detects only the rough outlines and/or further characteristic features of the target object 8, so that the third positioning system 3 aligns the transmitting/capturing device 2 to the target object 8. The exact capturing and tracking of the target object 8 is then possible by means of the first positioning system 7 and the second positioning system 6.

The detection range of the transmitting/capturing device 2 is increased through the use of the third positioning system 3.

Figure 3:
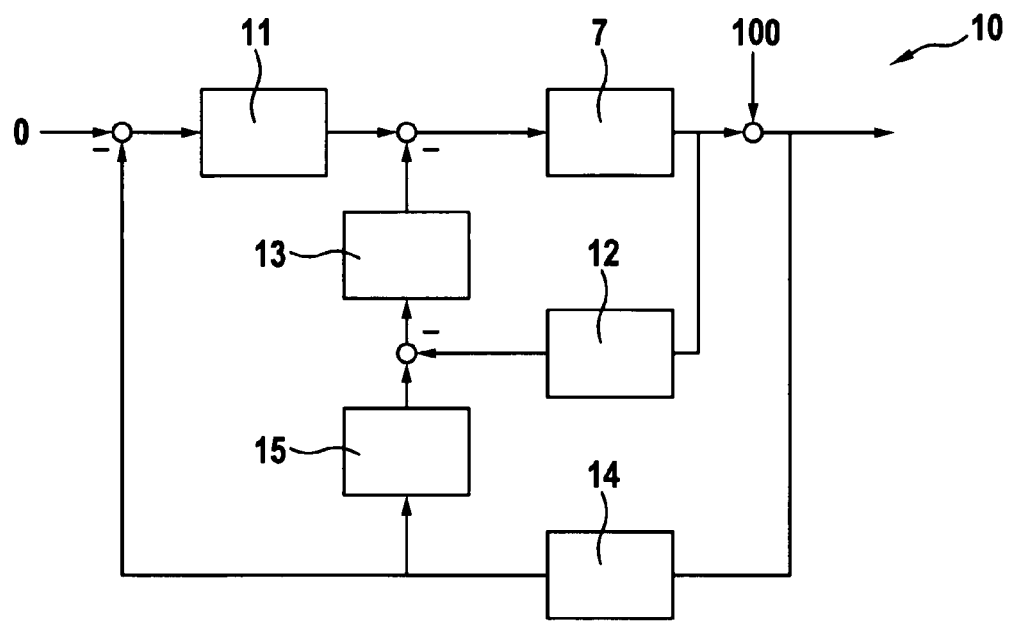
FIG. 3 shows a first schematic representation of the first control system of the active system according to the preferred exemplary embodiment of the invention.
Figure 4:
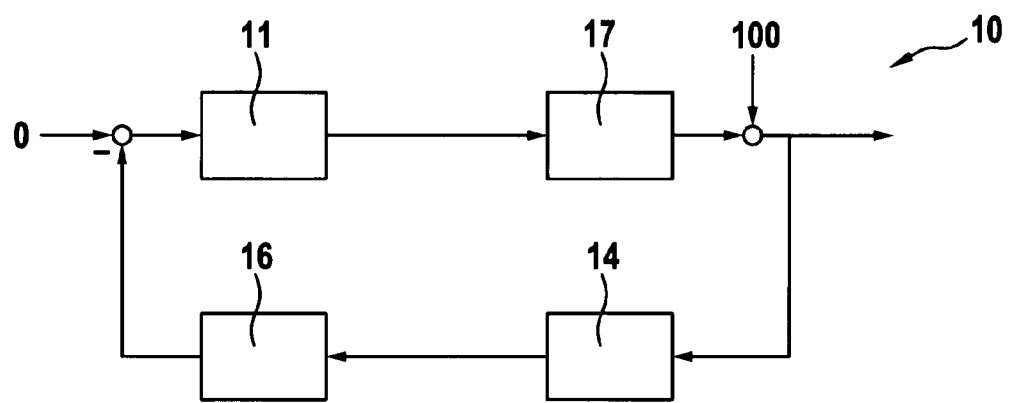
FIG. 4 shows a second schematic representation of the first control system of the active system according to the preferred exemplary embodiment of the invention.

A schematic drawing of the first control system 10 is shown in FIGS. 3 and 4. FIG. 3 shows the structure of the first control system 10 according to the preferred embodiment. The first control system 10 thus comprises a first controller 11, which is designed in particular as a PID controller. The first controller 11 transmits its output signal to the first positioning system 7. The deflection of the first positioning system 7 can be determined by means of a measuring device 12, so that the result of this measurement is passed to a filter 13. The filter 13 in turn controls the positioning device 7 in addition to the first controller 11, in order to produce a precise deflection of the first positioning system 7.

However, as a deviation 100 of the target object 8 from a reference point can result through the movement of the target object 8, this deviation 100 also affects the first control system 10. This deviation 100 of the target object 8 is detected by the detection device 14 and, after being subjected to a proportionality factor 15, likewise transferred to the filter 13. In addition, the deviation 100 is guided by the detection device 14 directly to the first controller 11. In this way, a feedback system is provided, which enables a permanent capturing and tracking of the target object 8.

The value 0 is assumed as a reference variable for the first controller 11, which means that no deviation 100 is present between the target object and the reference point. Thus, the deviation 100 is determined by the detection device and deducted from the reference variable in order to pass the result to the first controller 11. This then regulates the deviation 100 by driving the first positioning system 7.

The drive signal of the positioning system 7 consists, as previously described, of a signal of the first controller 11 and a signal of the filter 13. For coupling these signals, the signal of the filter 13 is subtracted from the signal of the first controller. The input signal of the filter 13 in turn consists, as described above, of a signal from the detection device 14 and a signal from the measuring device 12, wherein the signal from the measuring device 12 is subtracted from the signal from the detection device.

The control system 10 in FIG. 4 is simplified for the sake of clarity. To this end, transfer functions of the first controller 11, the filter 13 and the proportionality factor 15 are grouped into a first simplification member 16. Similarly, the first positioning system 7, the filter 13 and the measuring device 12 are grouped into a second simplification member 17. The grouping of transfer functions of diverse components is well known from the prior art. The following relationships thus result:

$$G_7 = \frac{G_2}{1 - G_2 \cdot G_3 \cdot G_4} \quad G_8 = 1 + \frac{G_3 \cdot G_5}{G_1}$$

G1 transfer function of the first controller 11
G2 transfer function of the first positioning system 7
G3 transfer function of the filter 13
G4 transfer function of the measuring device 12
G5 proportionality factor 15
G6 transfer function of the detection device 14
G7 transfer function of the second simplification member 17
G8 transfer function of the first simplification member 16

Figure 5:
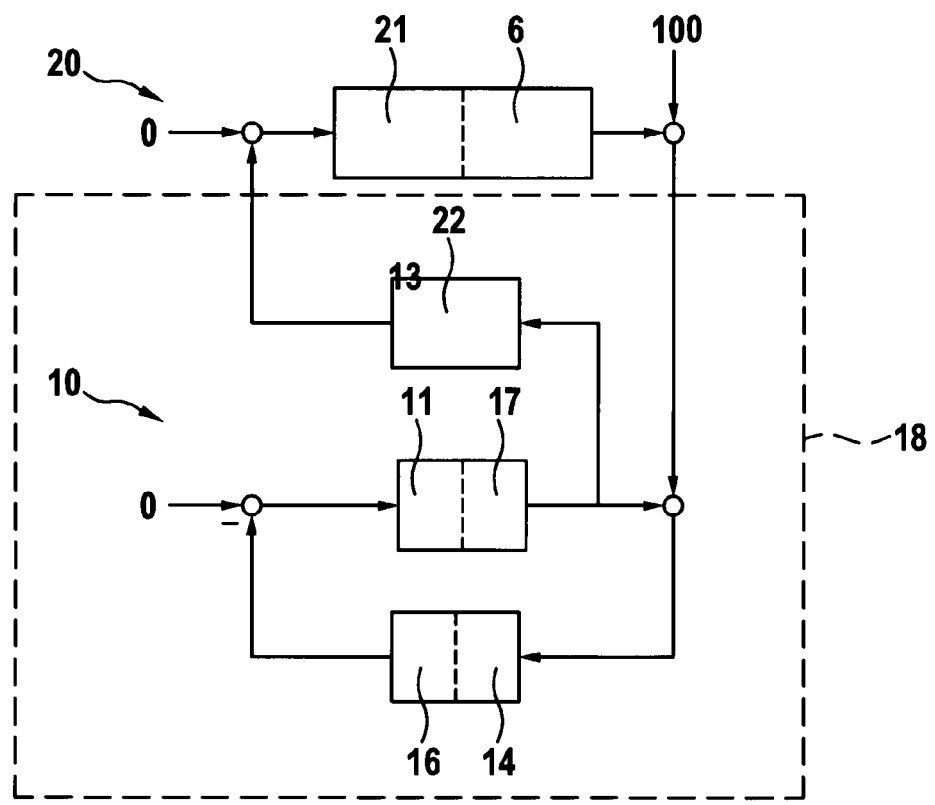
FIG. 5 shows a schematic representation of the first control system and the second control system of the active system according to the preferred exemplary embodiment of the invention.

FIG. 5 shows the combination of the first control system 10 with the second control system 20. Here, the first control system 10 comprises the simplified components shown in FIG. 4. The second control system 20 comprises a second controller 21, which is also preferably a PID controller. The second controller 21 uses the output of the second simplification member 17 (which comprises the measuring device 12) to drive the second positioning system 6. For this purpose, the signal of the second simplification member 17 is amplified by a proportionality factor 22. Here, too, the constant value 0 is accepted as a reference variable, which means that the measured deflection of the first positioning system 7 is to be zero. The output signal of the proportionality factor is therefore added to the reference variable, in order to then transfer this sum to the second controller 21.

It can be seen that the aforementioned structure couples the first control system 10 and the second control system 20, in that the control loop of the second control system 20 is closed by the first control system 10 and the second positioning system 6 is driven on the basis of the deflection of the first positioning system 7. The transmitting/capturing unit 2 thus benefits from the performance of the first control system 10 and the first positioning system 7, as well as from the large capturing range of the second positioning system 6.

Because of the coupling, the deviation 100 no longer acts on the output of the second simplification member 17 directly, but rather on the output of the second positioning system 6. This can already be seen from the structure of the transmitting/capturing device 2 shown in FIG. 2, as in following the beam path 9, the light reflected from the target object 8 first contacts the second positioning system 6 and only thereafter contacts the first positioning system 7 (contained in the simplification member 17). The deviation 100 is therefore no longer added to the output of the second simplification member 17, but rather the deviation 100 is first added to the output signal of the second positioning system 6, before this summed signal is added to the output signal of the second simplification member 17.

Likewise, as described herein for the coupling of the second control system 20 to the first control system 10, the third control system 30 can also be coupled to the second control system 20. In such an alternative embodiment, the industrial robot is used to retract the centralizing system to the zero position.

Alternatively to the above-mentioned coupling, in this embodiment the additional capturing device 4 is used to control the third positioning system. This is of particular use if the target, in particular due to a small field of view, cannot yet be captured with the transmitting/capturing device 2 and thus can only be aligned on the basis of the information from the additional capturing device. As already described above, the positioning system 3 allows the tracking of a target in a large angular range. The information from the additional capturing device 4 may also be used as a pre-control for the second positioning system 6.

Figure 6:
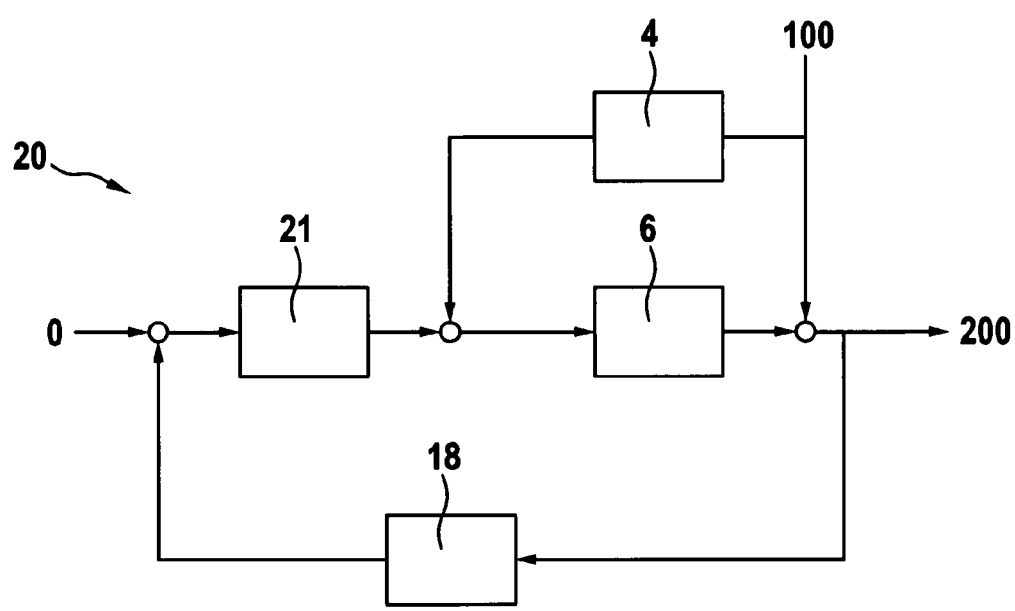
FIG. 6 shows a schematic representation of the first control system and the second control system of the active system according to the preferred exemplary embodiment of the invention with use of the information of the additional capturing device for controlling the second positioning system.

This is the case shown in FIG. 6. A third simplification member 18 is used for this purpose, which is defined in FIG. 5. The third simplification member 18 comprises the transfer functions of the first simplification member 16, the second simplification member 17, the first controller 11, the detection device 14 and the proportionality factor 22. The signals from the additional capturing device 4 are converted to a positioning signal and transmitted to the second positioning system 6. In addition to the second controller 21, the additional capturing device 4 thus controls the second positioning system 6, in that the output signal of the additional capturing device 4 is subtracted from the output signal of the second controller 21.

It is also possible to use only this method of control for the second positioning system 6 and to disregard the output of the second controller 21 in controlling the second positioning system 6. This is particularly useful during a connection process, in that the target can already be seen in the additional capturing device 4 due to the larger field of view, but not yet in the transmitting/capturing device 2.

In sum, there results for the first control system 10 and the second control system 20 a transfer function with the input "deviation 100" and an output 200 with the following total transfer function $G_{total}$.

$$G_{total} = \frac{1 - G_{11}G_{12}}{1 - G_{10}G_{12}G_{13}} G_{10} = -\frac{G_9 \cdot G_1 \cdot G_6 \cdot G_7 \cdot G_8}{1 + G_1 \cdot G_6 \cdot G_7 \cdot G_8}$$

G9 proportionality factor 22
G10 transfer function of the third simplification member 18
G11 transfer function of the additional capturing device 4 and an associated filter for signal conditioning
G12 transfer function of the second positioning device 6
G13 transfer function of the second controller 21

In addition, it should be pointed out that "comprising" or "having" do not exclude any other elements, and "a" or "an" does not exclude a plurality. Furthermore, it should be noted that features that have been described with reference to one of the above exemplary embodiments or embodiments can also be used in combination with other features of other exemplary embodiments or embodiments described above. Reference symbols in the claims shall not be regarded as limitations.

LIST OF REFERENCE CHARACTERS

1 active system
2 transmitting/capturing device
3 third positioning system
4 additional capturing device
5 lighting device
6 second positioning system
7 first positioning system
8 target object
9 beam path
10 first control system
11 first controller
12 measuring device
13 filter
14 detection device
15 proportionality factor
16 first simplification member
17 second simplification member
18 third simplification member
20 second control device
21 second controller
22 proportionality factor 100 deviation
200 output

The invention claimed is:

1. An active system, comprising
a transmitting/capturing device having a detection device configured to capture a target object, wherein the transmitting/capturing device comprises a laser source and a camera;
a first control system configured to drive a first positioning system to align a beam path between the transmitting/capturing device and the target object;
a second control system configured to drive a second positioning system to align the beam path; and
a third control system configured to drive a third positioning system to align the transmitting/capturing device,
wherein the third control system comprises an additional capturing device and the third positioning system can be driven on the basis of data from the additional capturing device.

2. The active system according to claim 1, wherein the first control system is coupled to the second control system.

3. The active system according to claim 2, wherein the first positioning system has a zero position and the second control system is adapted to move the first positioning system to the zero position and/or to hold the first positioning system in this zero position by driving the second positioning system.

4. The active system according to claim 3, wherein the first control system drives the first positioning system based on data from the transmitting/capturing device.

5. The active system according to claim 3, wherein the second positioning system can be driven on the basis of data from the additional capturing device.

6. The active system according to claim 2, wherein the first control system drives the first positioning system based on data from the transmitting/capturing device.

7. The active system according to claim 2, wherein the second positioning system can be driven on the basis of data from the additional capturing device.

8. The active system according to claim 1, wherein the second control system and the third control system can be driven in a coupled manner, in that the second positioning system has a zero position and the third control system is adapted to move the second positioning system to the zero position and/or to hold the second positioning system in this zero position by driving the third positioning system.

9. The active system according to claim 8, wherein the first control system drives the first positioning system based on data from the transmitting/capturing device.

10. The active system according to claim 8, wherein the second positioning system can be driven on the basis of data from the additional capturing device.

11. The active system according to claim 1, wherein the transmitting/capturing device is an optical transmitting/capturing device.

12. The active system according to claim 1, wherein the transmitting/capturing device comprises an acting device.

13. The active system according to claim 1, wherein the first positioning system is a piezoelectric actuator.

14. The active system according to claim 1, wherein the second positioning system is a moving coil unit.

15. The active system according to claim 1, wherein the third positioning system is an industrial robot.

16. The active system according to claim 1, wherein the first control system drives the first positioning system based on data from the transmitting/capturing device.

17. The active system according to claim 16, wherein the second positioning system can be driven on the basis of data from the additional capturing device.

18. The active system according to claim 1, wherein the second positioning system can be driven on the basis of data from the additional capturing device.

* * * * *